UNITED STATES PATENT OFFICE.

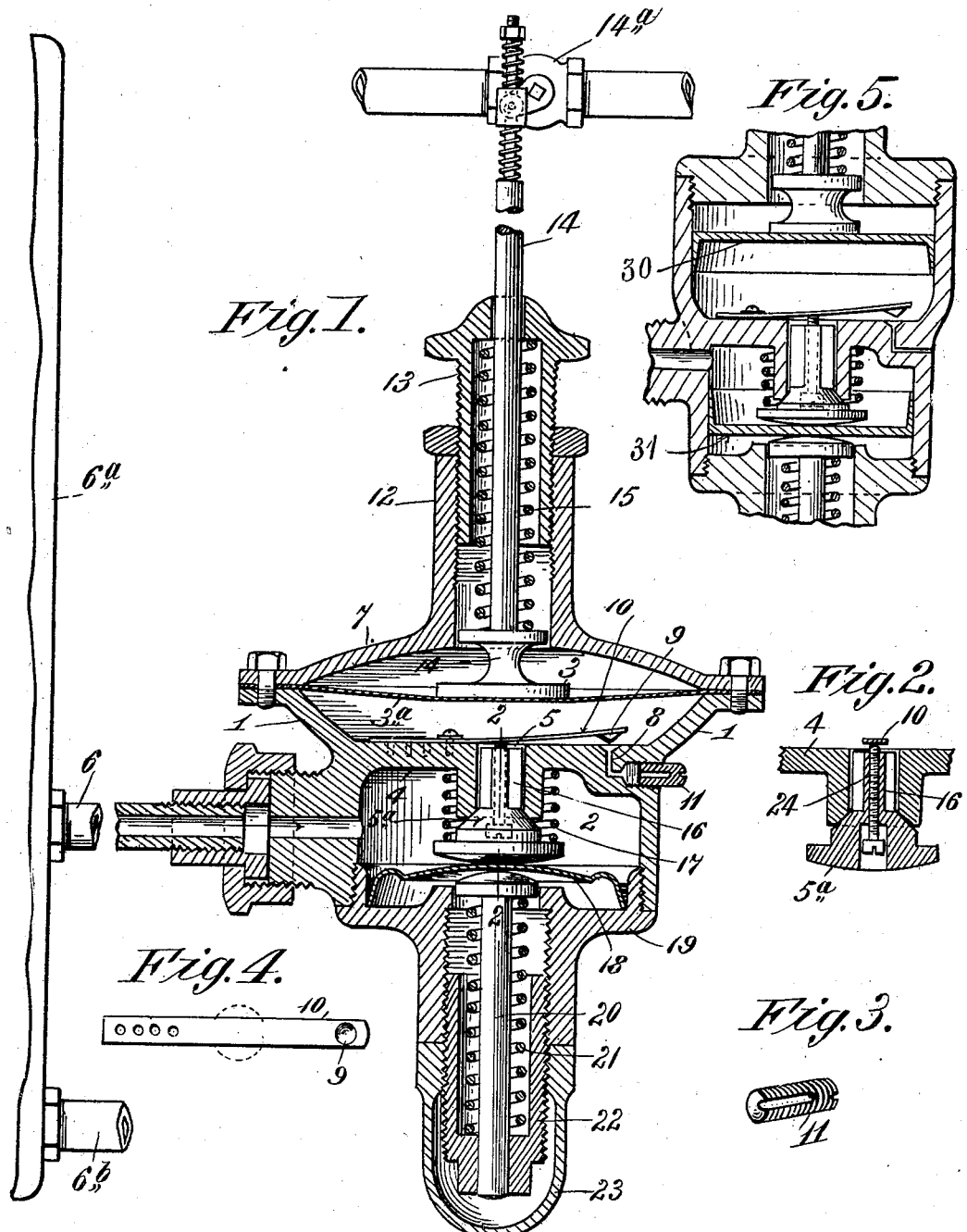

JAMES H. BULLARD, OF SPRINGFIELD, MASSACHUSETTS.

PRESSURE-REGULATOR.

SPECIFICATION forming part of Letters Patent No. 660,359, dated October 23, 1900.

Application filed April 2, 1900. Serial No. 11,079. (No model.)

*To all whom it may concern:*

Be it known that I, JAMES H. BULLARD, a citizen of the United States of America, residing at Springfield, in the county of Hampden and State of Massachusetts, have invented new and useful Improvements in Pressure-Regulators, of which the following is a specification.

This invention relates to pressure-regulators, the object thereof being to so improve the construction of devices of this character that they will operate at definite minimum and maximum pressures. This regulator is of that class which is attached to receivers containing air or other gaseous fluids under pressure and which are adapted to maintain a given pressure, approximately, in said receivers by a connection between a movable member of the regulator and a valve in a pipe through which air may be forced into the receiver or through which some motive force may be supplied to or cut off from an air-compressor, the operation of the regulator being the same in either case. In regulators of this class as at present constructed the movable member thereof will generally vibrate between a valve-opening and a valve-closing position without definitely assuming either one of these positions. It is desirable that this characteristic, for certain reasons, should be overcome, and the hereinafter-described construction is adapted to insure the positive operation of the regulator within a definite range of pressures.

In the drawings the regulator is shown connected with a reservoir and with the valve in a pipe. The latter may either be supposed to lead to a source of supply for said reservoir or it may be assumed that this pipe is the steam-supply pipe of a power-actuated compressor not shown in the drawings.

Figure 1 of the drawings is a vertical sectional view of a regulator embodying this invention and also shows a portion of a receiver adapted to contain air under pressure. Fig. 2 is a vertical section on line 2 2, Fig. 1, showing a portion of a partition in the regulator and a valve for closing a passage through said partition. Fig. 3 is a perspective view of a regulating-screw, and Fig. 4 is a plan view of a spring-arm. Fig. 5 shows a modification of the construction shown in Fig. 1.

Referring to the drawings, 1 indicates the case of a regulator, which is circular in cross-section. This case is divided into two chambers, one over the other, (indicated by 2 and 3,) normally air-tight and separated by a partition 4, through which is a passage 5, controlled by the valve $5^a$. A pipe 6 places the chamber 2 in communication with an air-reservoir $2^a$, whose pressure it is to regulate. In the chamber 3 is a flexible diaphragm $3^a$, of sheet metal or other suitable material, secured by its edges between that part of the case and a cap 7 which constitutes the said chamber 3. Said diaphragm divides said chamber horizontally into two hermetically-sealed parts. From the lower part an air-passage 8 leads down into the partition 4 and thence in a right-angular direction out through the wall of the case. The inner end of said passage is of conical form to adapt it to serve as a seat for a valve 9 on the end of the spring-arm 10, which is secured to the partition 4 by a screw in such position that it will pass centrally over the end of the passage 5 between the chambers 2 and 3. The width of said arm, however, is not sufficient to obstruct the free passage of air between said chambers. The outer end of the passage 8 is counterbored to receive a screw 11, which has a longitudinal groove cut in its surface extending from its inner end about half-way up the threaded part thereof. By turning the screw in to cover more or less of the end of the groove on the body of the screw the escape of air from the chamber 3 may be regulated whenever the valve 9 is lifted off its seat. Said cap 7 of the chamber 3 is provided with an upwardly-extending neck 12, into which is screwed the piece 13, the upper end of which is closed and bored out to receive the rod 14, its lower end being provided with a circular head, to which is attached in any suitable manner the diaphragm $3^a$. The upper end of said head also fits the interior bore of the neck 12 and serves to hold said rod 14 in a central position relative to said neck. The outer end of said rod is connected with a valve $14^a$, which, as described, may be assumed to control the passage through a pipe leading into said reservoir, which is designated by 6ª, or it may be assumed to be a pipe through which steam is conveyed to an air-compressor, whereby air may be forced into said reservoir through any pipe, as 6ᵇ, leading from said compressor to said reservoir. A controlling-spring 15 is located on said rod 14 and bears against the end of the piece 13 and against the head on the rod which is attached to the diaphragm 3ª, and thus exerts a downward pressure on the latter, the degree of which pressure indicates the amount of pressure it is desired to carry in the reservoir on an area equal to that of the diaphragm. The tension of this spring 15 may be regulated by turning the piece 13 in or out of the neck 12. The passage 5 through the partition 4, which separates the chambers 2 and 3, is made of sufficient length to give a good bearing to the guide-wings 16 on the valve 5ª to insure the true seating of said valve to close the passage 5, and this length of bearing is provided by a boss extending down centrally from said partition, in the lower end of which boss is the seat for the valve 5ª. A spring 17, between the partition 4 and the valve 5ª, insures the contact of the valve with a second diaphragm 18, fixed in the cap 19, which screws into the case and with the latter constitutes the chamber 2. Said spring 17 also assists the valve in its unseating movement, which occurs under the pressure of the diaphragm 18. Said diaphragm is of considerably-smaller area than the diaphragm 3ª and forms, practically, a flexible bottom for the chamber 2 and is supported against deflection by a spring-supported plunger 20, whose upper extremity is held in contact with the under side of the diaphragm by a coiled spring 21. The cap 19 is, like the cap 7, provided with a neck into which is screwed a piece 22, between the closed end of which and a head on the plunger 20 the said spring 21 is located. The resistance to compression of said spring determines the pressure under which the diaphragm 18 shall yield to permit the opening of the valve 5ª, and the consequent admission of air into the chamber 3, whereby the valve 14ª may be operated. This spring 21 may be regulated by screwing the part 22 in or out of the neck on the cap 19. The end of the piece 22 which projects beyond the end of the neck of the cap 19, as well as the end of the plunger 20 which projects through the closed end of said piece 22, is inclosed by a small cap 23, which screws onto that part of the piece 22 which projects beyond the end of the neck on said cap and which serves the double function of check-nut for the piece 22 and as a protective covering for the lower end of the plunger 20. The diaphragm 18 is secured in the cap 19 in the position shown in the drawings in any manner which will securely seal its edges against the escape of air through the cap 19. A convenient way of doing this is to run solder into the space between the edge of the diaphragm and the flange of the cap.

The valve 5ª is adapted to come to a bearing against the spring-arm 10 to force the valve 9 away from its seat when the valve 5ª closes, and, inversely, when the latter opens by reason of the depression of the diaphragm 18 the spring action of the arm 10 will cause the valve 9 to seat. To provide for any degree of movement of the valve 9 away from its seat, an adjusting-screw 24 is located in the valve 5ª, being inserted therein from the bottom of the valve, its point coming out centrally of the wings 16, whereby it will bear on the under side of the spring-arm 10, which lies diametrically across the passage 5, in which said valve operates.

The position which the parts of the regulator occupy in Fig. 1 is that which they would assume before the pressure in the reservoir 6ª has reached the point at which the regulator is adapted to operate to cut off the supply of pressure to said receiver. Under these conditions the operation of the regulator when the maximum pressure has been reached in said reservoir will be as follows: The pipe connection between the reservoir and the chamber 2 of the regulator being normally open, the pressure in said chamber and reservoir will be uniform. When that pressure is sufficient to overcome the resistance of the spring 21, the diaphragm 18 will be depressed and the valve 5ª will move away from its seat, thus opening the passage 5 into the chamber 3. The descent of the valve 5ª allows the spring-arm 10 to fall and the valve 9 to seat itself, thus closing the passage 8.

The diaphragm 3ª is shown in the drawings to be of greater area than that of the diaphragm 18. This difference in area may be as great or as little as desired, the area of the larger diaphragm being determined by the amount of force which it is desired to apply to operate the valve 14ª. The resistance of the spring 15 will bear the same relation to the area of the diaphragm 3ª as the resistance of the spring 21 does to the diaphragm 18. Hence the same pressure which will serve to depress the latter will operate the diaphragm 3ª in the opposite direction and cause it to move the valve, as stated. This action of the diaphragm 3ª takes place as soon as the valve 5ª drops away from its seat, and hence as long as sufficient pressure is maintained between the diaphragms 18 and 3ª to overcome the resistance of their springs the valve 14ª remains closed. As soon, however, as the pressure drops sufficiently to allow the spring 21 to expand and raise the diaphragm 18 the valve 5ª will close by the movement of said diaphragm, thus cutting off pressure from the chamber 3, and the closing movement of the valve 5ª will lift the valve 9 off its seat, and the pressure of air contained in the chamber 3 will gradually escape through the passage 8, allowing the spring 15 to force the rod 14 downward and open the valve 14ª.

The connection between the end of the rod 14 and the valve-stem may be made in any suitable way; but it is desirable that said connection should be yielding in the direction of movement of said rod, to the end that in the case of the use of a globe-valve, for example, the rod 14 may have a slight movement in excess of that necessary to seat the valve, whereby any fine adjustment of the rod movement is rendered unnecessary and all danger of subjecting any part of the regulator to a strain is obviated.

From the foregoing description it will be seen that the pressure necessary to operate the valve 14$^a$ is absolutely shut out of the chamber 3 after the pressure falls below a certain point in the reservoir and that the air-passage to said chamber is opened only long enough to permit the pressure in the reservoir to be reduced to the point at which a fresh supply of air is required to maintain its normal average. Thus the action of the regulator is positive, and it is impossible for it to just balance between the open and closing positions, which is a common characteristic of the single-diaphragm regulators as at present constructed.

Throughout the preceding description of this invention reference has been made only to a diaphragm as means whereby certain movements may be imparted to valve-operating mechanism; but I do not wish to confine myself strictly to the use of a diaphragm, for any movable member having the characteristics of a diaphragm may be substituted for the latter without impairing in the least the efficiency of the construction as described herein. The equivalent of the diaphragms is illustrated in the construction shown in Fig. 5, in which the piston-heads 30 and 31 have been substituted for the diaphragms 3$^a$ and 18, respectively, without necessitating any change in the construction or relation of other parts of the device. It is only essential to the proper operation of the regulator that the diaphragms, pistons, or other analogous constructions should be in effect yielding partitions within the closed casing of the regulator, adapted to transmit movements, as described, to certain parts by means of a sufficient air-pressure introduced between them to effect their movement in opposite directions.

Having thus described my invention, what I claim, and desire to secure by Letters Patent of the United States, is—

1. In a pressure-regulator, two separate chambers, a diaphragm in each, a passage between said two chambers, a valve in said passage supported on one of said diaphragms, whereby pressure against the latter will effect the opening of said valve, and permit said pressure to enter the other of said chambers, whereby the other of said diaphragms will be operated; an outlet from said last-named chamber, and means for controlling said outlet, substantially as described.

2. In a pressure-regulator, a suitable case, a diaphragm and means connected therewith for operating a device outside of said regulator, a spring for controlling the movements of said diaphragm; a second diaphragm, a spring for controlling the latter; a partition between said diaphragms; a passage therethrough, a valve supported on said second diaphragm and adapted normally to close said passage; an outlet through the wall of the case on that side of said partition on which said first-named diaphragm is located, and means operated by the valve for opening or closing said outlet, substantially as described.

3. In a pressure-regulator, a suitable case, two chambers therein, a diaphragm in one of said chambers, and means connected therewith for operating a valve; another diaphragm in said second chamber adapted to be operated by pressure from an outside source, a passage between said chambers, a valve in said passage supported on said second diaphragm whereby the deflection of the latter will effect the unseating of said valve and permit the actuation of said first-named diaphragm; an outlet from said first-named chamber to the open air, and means for opening said outlet by the closing movements of said valve, substantially as described.

4. The combination with a reservoir, of a regulator adapted to maintain a normal average air-pressure therein, comprising a chamber in direct communication with said reservoir, and a diaphragm in said chamber; a second chamber, a diaphragm therein and means connected with said diaphragm adapted to regulate the admission of pressure to said reservoir; a passage between said chambers, and a valve in said passage supported in closed position by the diaphragm of said first-named chamber, whereby, upon the deflection of said first-named diaphragm, said valve is adapted to open said passage whereby the operation of said second diaphragm is effected; an outlet from said first-named chamber adapted to be opened and closed by the movements of said valve, substantially as described.

5. In a pressure-regulator, two separate chambers, a movable partition in each, a passage between said two chambers, a valve in said passage, supported on one of said partitions, whereby pressure against the latter will effect the opening of said valve and permit said pressure to enter the other of said chambers, whereby the other of said partitions will be operated; an outlet from said last-named chamber and means for controlling said outlet; combined with means operated by the movement of one of said partitions for imparting movement to a member outside of said regulator, substantially as described.

JAMES H. BULLARD.

Witnesses:
WM. H. CHAPIN,
K. I. CLEMONS.